United States Patent Office 3,280,183
Patented Oct. 18, 1966

3,280,183
METHOD OF PRODUCING DICARBOXYLIC ACIDS
Allison Maggiolo, Merion Park, Pa., assignor to Wallace
& Tiernan Inc., Belleville, N.J., a corporation of Delaware
No Drawing. Filed Apr. 11, 1963, Ser. No. 272,213
17 Claims. (Cl. 260—533)

This invention relates to methods of producing dicarboxylic acids, and more specifically an alkanedioic acid having between eight and twelve carbon atoms, from a cycloalkene material having the same number of carbon atoms as the dicarboxylic acid to be produced. These alkanedioic acids, or aliphatic $\alpha,\omega$-dicarboxylic acids, having between eight and twelve carbon atoms have been known for many years, but, with the exception of certain unrelated methods of producing sebacic acid, no economically feasible method for their manufacture has been proposed heretofore, and with the exception noted these acids are not available commercially.

The formation of acids by the cleavage of a double bond with ozone has been known for several years. Oleic acid, for example, has been ozonized and the ozonide intermediate oxidized to form azelaic acid,

$HOOC(CH_2)_7COOH$ and nonanoic acid (pelargonic acid), $H_3C(CH_2)_7COOH$. Glutaric acid, $HOOC(CH_2)_3COOH$, and adipic acid, $HOOC(CH_2)_4COOH$, have been prepared by ozonizing cyclopentene and cyclohexene, respectively, in ethyl acetate at 0° C., then heating with excess water to 100° C. with introduction of oxygen. The preparation of adipic acid by ozonolysis of cyclohexene already has been investigated in considerable detail. Treatment with ozone was carried out at −70° C. using a solution of cyclohexene and methanol. The methanol then was evaporated at room temperature and the peroxidic residue was dissolved in formic acid or acetic acid. Oxidation thereupon was carried out by adding hydrogen peroxide, warming gently, then heating to 105°–120° C.; or gaseous oxygen with some ozone as catalyst may be passed through the solution at 35°–70° C. for 1.5 hours and then the solution refluxed at 105° C. for about half an hour while admitting more oxygen. Alternatively, a formic acid-acetic acid mixture may serve as the medium both for ozonization at −5° C., and then for high temperature oxidation over a two hour period using added hydrogen peroxide at a reflux temperature approaching about 120° C.

Attempts to adapt these procedures for preparing adipic acid to the production of higher dicarboxylic acids from the corresponding cycloalkenes have given poor yields and prolonged duration of reactions. The changing of solvent media between the ozonization and oxidation steps obviously adds to the complexity and cost of the procedure. When a medium such as acetic acid is used throughout the process and the temperature is raised to about 110°–120° C. for the oxidation, as suggested by the prior art, the yield is limited even though the reaction is permitted to proceed for many hours. If the treatment with oxidizing agents is carried out first at temperatures below about 70° C. and then at temperatures of 100°–120° C.— which was proposed heretofore for producing adipic acid after ozonization of cyclohexene in methanol, evaporating, and dissolving in formic acid—relatively low yields are obtained by commercial standards when it is attempted to produce the corresponding alkanedioic acids from the higher cycloalkenes such as cyclooctene.

It is an object of this invention, therefore, to provide a new and improved method of producing an alkanedioic acid having between eight and twelve carbon atoms from the corresponding cycloalkene which avoids one or more of the disadvantages of the prior methods for producing such acids.

It is another object of this invention to provide a new and improved method of producing such an alkanedioic acid giving commercially acceptable yields and reaction rates.

It is a further object of the invention to provide a new and improved method of producing an alkanedioic acid from a cycloalkene starting material of the class represented by cyclooctene and cyclododecene in which such acid is recovered from the same solvent medium in which the cycloalkene was placed at the start of the process.

In accordance with the invention, the method of producing an alkanedioic acid having between eight and twelve carbon atoms from a cycloalkene material comprises subjecting the cycloalkene which has the same number of carbon atoms as the aforementioned alkanedioic acid to ozonization in a lower fatty acid medium. The same method of the invention additionally comprises thereafter heating the fatty acid medium containing the product of ozonization to a temperature of approximately 65°–70° C., while passing oxygen-containing gas into intimate contact with the medium containing such product, to initiate oxidation of that product with production of the alkanedioic acid; further raising the temperature, while continuing to supply the oxygen-containing gas to the medium, in accordance with a predetermined schedule of at least two further temperature increases each of approximately 5°–20° C. to a final temperature of approximately 100°–110° C., the temperature being held relatively constant before and after each of these further temperature increases for time periods having substantial individual durations, all of these durations being of the same order of magnitude. The same method of the invention finally comprises recovering the alkanedioic acid from the medium after the last of the aforesaid time periods. It is noteworthy that, when the method of the invention is practiced with the precautions conventionally followed by those skilled in the art to obtain efficiency and high yields, the alkanedioic acid thus recovered is produced in a yield, expressed as a percentage relative to said cycloalkene material, at least 10% greater than the yield, likewise expressed as a percentage of theoretical yield, obtainable if treatment with the oxygen-containing gas were carried out only at a temperature of 100° C., the alkanedioic acid also being produced in a total time of treatment with the oxygen-containing gas no longer than two thirds of the time required to obtain substantially the same yield, if treatment with such gas were carried out only at 70° C.

It will be understood that, as used in the present specification and in the appended claims, the phrase, "oxidation of the product of ozonization," applies generally to the oxidative decomposition of an ozonide, or of a peroxidic or other product of the ozonization, yielding the desired alkanedioic acid, and that the dried product resulting from the method of the invention ordinarily contains, in admixture with the desired dicarboxylic acid, other materials, principally other monocarboxylic and dicarboxylic acids and usually in minor proportions. The desired alkanedioic acid subsequently may be refined to any required purity by conventional methods which do not form a part of the method of the present invention.

For a better understanding of the present invention, together with other and further objects thereof, reference is had to the following description, and its scope will be pointed out in the appended claims.

The method of producing an alkanedioic acid having between eight and twelve carbon atoms from a cycloalkene material, in accordance with a preferred embodiment of the invention, comprises subjecting 1 part by weight of the cycloalkene, which has the same number of carbon atoms as the desired alkanedioic acid, to ozonization while in solution with a liquid lower fatty acid medium. Any of the saturated lower fatty acids and mixtures thereof ordinarily are satisfactory for the reaction medium, although the fatty acid medium preferably is selected from the group consisting of acetic acid, propionic acid, and isobutyric acid. In this embodiment the medium conveniently is provided in the form of 8 parts by weight of propionic acid. Ozone is introduced into the system in dry oxygen at a concentration of 2% to 7% ozone by weight, using a conventional ozonator, until the amount of the ozone theoretically required to form the ozonide of the cycloalkene, that is, an amount of $O_3$ equimolar with the amount of the cycloalkene present, has been supplied.

The mixture ordinarily is kept at a temperature below about 25° C. throughout the addition of ozone. A major purpose in maintaining a temperature substantially below room temperature during the ozonization is to minimize loss of the cycloalkene starting material, which at higher temperatures tends to be carried away as vapor with the gases leaving the system. The choice of temperature is primarily a matter of economics. For example, and especially with the cycloalkenes lower in molecular weight than cyclododecene and cycloundecene, substantial improvements in yield can be achieved by carrying out the ozonization at a temperature of roughly 5° C. instead of about 25° C. Maintaining a temperature of, say, —40° C. would provide further savings in the cycloalkene and consequent apparent improvement in yields. As a compromise between cost of starting material and cost of refrigeration, it is recommended, as examples, that cyclooctene solutions be kept below about 15° C., cyclodecene below about 20° C., and cyclododecene below about ordinary room temperature or at least below about 25° C. Temperatures still somewhat lower than these suggested maxima are recommended in practice; alternatively, higher temperatures may be found to be justifiable economically when any vaporized cycloalkene is not lost to the atmosphere but is recovered by condensing or refluxing after escaping from the reaction medium, whereby extensive loss of the cycloalkene is avoided and the effective yield is not decreased prohibitively through vaporization losses.

After the ozonization, the propionic acid medium containing the product of ozonization is heated to raise the temperature to approximately 65°–70° C., and conveniently to 70° C., while oxygen-containing gas (that is, a gas rich in free oxygen), which may be air but preferably is unozonated oxygen itself, is passed into intimate contact therewith, to initiate oxidation or oxidative decomposition of the product of ozonization with production of the desired alkanedioic acid. The temperature then is raised further in accordance with a predetermined schedule while continuing to supply the oxygen to the medium. At least two further temperature increases, each of approximately 5°–20° C., should be carried out, reaching a final temperature of approximately 100°–110° C. In this embodiment three further temperature increases are carried out. Thus, after 2 hours have elapsed, the temperature is raised 10°, to 80° C., and maintained there for 2 hours. The temperature then is raised another 10°, to 90° C., and maintained there for another 1.5 hours. Finally, the temperature is raised an additional 10°–20° C., to approximately 100°–110° C., and held there for an additional 1.5 hours. When it is stated that the temperature is raised to a higher temperature and held there for 1.5 or 2 hours, it will be understood that perhaps the first 15 minutes of this holding time will be required to complete the raising of the temperature through the 5°–20° increase. Thus the temperature is held relatively constant before and after each of the temperature increases above 70°, for time periods having substantial individual durations, all of these durations being between about 1.5 and 2 hours and hence of the same order of magnitude. The alkanedioic acid then is recovered from the liquid fatty acid medium, ordinarily by distillation of the medium and drying.

In a specific example of the materials used in the preferred embodiment of the invention, of which the procedural aspects are set out hereinabove, the method of producing suberic acid, $HOOC(CH_2)_6COOH$, from cyclooctene comprises reacting 1 part by weight of cyclooctene, dissolved in 8 parts of propionic acid medium maintained at a temperature of approximately 0° C. and preferably within one degree of 0°, with an equimolar amount of ozone supplied to the medium as about 4% by weight of the dry oxygen gas. The temperature schedule specified above then is followed, with holds at 70°, 80°, 90°, and 105° C. After the last of these holding time periods the oxygen flow is stopped, the propionic acid medium is evaporated or distilled off under a vacuum of 58 mm. of mercury at about 74° C., and the residue is dried under vacuum with moderate heat applied. For determining the assay of the suberic acid solids remaining, the dry acid mixture may be esterified and the suberic acid content determined by gas-liquid chromatography. Suberic acid readily is produced by such procedures in a yield of at least 75% of the amount equimolar with the cyclooctene starting material, and in this instance the yield of suberic acid was found to be 78.6% of the theoretical yield.

Using similar products of ozonization at 0° C., various time-temperature schedules have been tried using a variety of acid media. Among these experiments those summarized in Table I are informative. The lower yields and longer reaction times are significant.

TABLE I
[Effect of oxidizing conditions on ozonized cyclooctene]

| Solvent Acid | Cyclooctene-Solvent Ratio | Time-Temperature Schedule | | Yield, Percent |
|---|---|---|---|---|
| Propionic | 1:8 | 95–105° C | 7.5 hours | 61.2 |
| Do | 1:8 | 100° C | .25 hour | |
| | | 70° C | 7.75 hours | |
| Isobutyric | 1:4 | 70° C | 8 hours | 65.0 |
| Propionic | 1:8 | 70° C | 8 hours | 72.6 |
| Isobutyric | 1:4 | 70° C | 13 hours | 73.0 |
| Propionic | 1:8 | 70° C | 13 hours | 76.0 |
| Do | 1:8 | 70° C | 2 hours | 77.1 |
| | | 80° C | 2 hours | |
| | | 90° C | 1.5 hours | |
| | | 105–110° C | 1.5 hours | 78.6 |

Comparison of the last experiment summarized in Table I, which is the example set out in detail hereinabove, with the first experiment listed in Table I shows that the yield was increased materially from a yield of 61.2%, obtained when treatment with the oxygen-containing gas is carried out for at least as long a period of time but only at a temperature of about 100° C. Raising the temperature initially to 100° tends to limit the yield of suberic acid to less than 65%, while following the temperature schedule of the method of the present invention provides yields of suberic acid of more than 75%. Thus the alkanedioic acid, in this instance suberic acid, is produced under otherwise identical conditions in a yield relative to the cycloalkene starting material, in this instance cyclooctene, at least 10% greater than the yield obtainable if treatment with the oxygen-containing gas were carried out only at a temperature of 100° C.

Various experiments with oxidation carried out at 70° C. also are reported in Table I. In some of these experiments cyclooctene again was used in a weight ratio to a propionic acid medium of 1:8; one such experiment gave a 73.0% yield of suberic acid after oxidation at 70° for 8 hours, while the best result obtained at that temperature was a 77.1% yield after a 13-hour oxidation period. In general it can be concluded that, should it be possible to obtain substantially the same yield (e.g., approaching 78% yield of suberic acid) if treatment with the oxygen-containing gas were carried out only at 70° C., but under conditions otherwise identical to those followed when the method is carried out in accordance with the present invention, the alkanedioic acid can be produced with such a yield in a total time of such treatment in accordance with the invention no longer than two thirds of the time required at 70° C. From Table I it is seen also that the smallest proportion by weight of cyclooctene used was 1 part per 8 parts of the solvent, or 11.1% of the total weight of dissolved reagent and solvent medium, indicating that the cycloalkene should make up at least about 10% of the total weight of the charge subjected to ozonization.

It will be understood that the alkanedioic acid may be recovered from the fatty acid medium by any available procedure when the oxidation step is completed. Methods other than distillation of the medium, such as separation by freezing or by formation of insoluble reaction products easily broken down after filtering, undoubtedly will occur to those skilled in the art.

In another specific example of materials preferred for use in carrying out the procedural steps embodying the method of the invention, the method of producing dodecanedioic acid, $HOOC(CH_2)_{10}COOH$, from cyclododecene comprises reacting 1 part by weight of cyclododecene, dissolved in 8 parts by weight of propionic acid maintained at a temperature of 8°–10° C., with ozone supplied as described hereinabove. The same temperature-time schedule then is followed while supplying oxygen-containing gas to the propionic acid medium, resulting in a yield of about 61%; dodecanedioic acid accordingly is produced readily by such procedures in a yield of at least 58% of the amount equimolar with the cyclododecene starting material, allowing for ordinary variations in reaction conditions.

In a modification of this preferred procedure, 5 parts of propionic acid are used as the reaction medium and a somewhat modified time-temperature schedule is followed. Thus, after the ozonization period, oxygen is passed through the system and the mixture is heated to 70° C. in 30 minutes and held there for another 90 minutes. The temperature then is raised through only 5° C., to 75° C., in 15 minutes and kept there for another 45 minutes, followed by another 5° increase to 80° in 15 minutes with steady temperature thereafter for another 45 minutes. The temperature then is raised to 90°–95° in 15 minutes and kept within this temperature range for 60 minutes. The temperature finally is raised to 100–110° C. and held for 90 minutes. The solvent thereupon is removed by distillation and the residue dried under vacuum with moderate heat applied, giving a 61.5% yield of dodecanedioic acid.

Similar procedures have been carried out after ozonization of cyclododecene at the same temperature of approximately 8°–10° C., but at temperatures differing from the temperature schedule which is a feature of the present invention. For comparison, reference may be had to Table II in which some of these tests are tabulated.

TABLE II
[Effect of oxidizing conditions on ozonized cyclododecene]

| Solvent Acid | Cyclododecene-Solvent Ratio | Time-Temperature Schedule | | Yield Percent |
|---|---|---|---|---|
| Propionic | 1:5 | 90° C | .5 hour | |
| | | 100–110° C | 7 hours | 43.7 |
| Do | 1:5 | 70° C | 7 hours | 53.5 |
| Do | 1:5 | 70° C | 13 hours | 60.0 |
| Do | 1:5 | 70° C | 2 hours | |
| | | 75° C | 1 hour | |
| | | 80° C | 1 hour | |
| | | 90° C | 1 hour | |
| | | 100–110° C | 1.5 hours | 61.5 |

The time-temperature schedule at the bottom of Table II is the modification of the preferred procedure which is described in detail hereinabove. Again it appears that raising the temperature initially, after ozonization, to about 100° C. decreases the yield by at least a 10% difference in percentage yield figures; in the case of dodecanedioic acid the decrease appears to be from over 60% to under 45%. To reach a 60% yield at 70° C., however, requires an oxidation time approaching 13 hours, only 53.5% yield being realized after 7 hours. Thus, again the yields obtainable in accordance with the invention are reached in no longer than two-thirds of the time required when oxidation is carried out only at 70° C. Similar results are obtainable in producing the alkanedioic acids intermediate in carbon chain length between suberic acid and dodecanedioic acid, the latter being the acids produced in the examples already given of specific materials used in carrying out preferred embodiments of the invention.

The reasons for the improved results obtained by following a time-temperature schedule of the type illustrated in these embodiments of the invention are not fully understood. When the temperature is advanced quickly above about 70° C., however, a tendency toward evolution of heat sometimes is quite noticeable, and a similar tendency may be observed if the temperature is raised quickly to over 100° after a hold at 70° or lower. It may well be that the benefits of the method of the present invention are realized at least in part through a modification in these exothermic effects which is brought about by the stepwise increases in the temperature at which the reaction system is maintained.

In another specific example of materials preferred for use in carrying out the procedural steps embodying the present invention, reference may be made again to the preferred embodiment of these procedural steps as set out hereinabove, in which ozonization is carried out below 25° and oxidation then is effected stepwise at about 70°, 80°, 90°, and finally 105°. This method is carried out to produce sebacic acid, $HOOC(CH_2)_8COOH$, from cyclodecene by reacting the cyclodecene, dissolved in propionic acid maintained at a temperature closely approximating 5° C., with ozone. When oxidation is effected by following generally the aforementioned time-temperature schedule, sebacic acid is formed and recovered in a yield of close to 65%, yields of at least 60% thus being obtainable when reasonable precautions are taken not only to prevent loss of cyclodecene by evaporation during the ozonization, but also to avoid excessively large jumps in the temperature of the reaction system during the succeeding oxidative decomposition of the intermediate product of ozonization.

The method of the invention also may be carried out using cyclononene as the starting cycloalkene material to produce azelaic acid, $HOOC(CH_2)_7COOH$. The ozonization and oxidation steps conveniently use the same amounts and proportions of the cyclononene as are set forth hereinabove for cycloalkenes generally, following the same procedural steps with respect to reaction conditions and times as are given hereinabove for the preferred embodiment of the invention. Likewise, use of cycloundecene for the starting material provides satisfactory yields of undecanedioic acid, $HOOC(CH_2)_9COOH$.

In the examples given hereinabove, the use of propionic acid as the reaction medium or solvent has been emphasized. Excellent results have been obtained also when using a fatty acid medium having a somewhat higher molecular weight, notably isobutyric acid, which has a conveniently low melting point and high boiling point. For example, when isobutyric acid is substituted in equal weight for propionic acid as the solvent medium for the cyclooctene in the method of the example summarized at the bottom of Table I, a comparable yield of suberic acid is obtained. Comparable results also are obtained when isobutyric acid is used, instead of propionic acid, in the examples mentioned hereinabove using cyclododecene and cyclodecene respectively as the starting material. The current high cost of the isobutyric acid, however, has resulted in a preference for use of propionic acid at present. Butyric acid, the five-carbon fatty acids except for the high-melting pivalic acid, and other materials with properties equivalent to those of the lower fatty acids also may be used. Equivalent excellent results have been obtained, for example, with propionic acid containing 10%–15% formic acid by weight. The use of formic acid alone is not recommended, however, because the cycloalkenes involved are only sparingly soluble in formic acid, requiring much greater quantities of the formic acid medium with consequent difficulty in effecting intimate contact of the materials carried by the medium with the reagent gases.

Acetic acid also is suitable for use as the reaction medium and may be the medium of choice under certain conditions of ozonization. In the ozonolysis of cyclooctene, it is necessary to commence ozonization in a medium of glacial acetic acid at a temperature no lower than 14°–16° C. to avoid crystallization of the medium. As the ozonolysis proceeds, however, the oily ozonide formed as the product of ozonization depresses the melting point of the acetic acid solvent to permit lowering the temperature to 10° or below. Thus, in another example, a solution of 1 part cyclooctene in 8 parts glacial acetic acid by weight is ozonized at 14°–15° for about 20 minutes, and ozonization then is continued at 8°–10° for several hours until at least stoichiometric amounts of ozone have been supplied for reaction with the cyclooctene. Thereafter oxidation is carried out while following the time-temperature schedule summarized at the bottom of Table I. A 68% yield of suberic acid is obtained; the relatively low yield is explained by loss of cyclooctene through vaporization during ozonization. Condensing cyclooctene from the oxygen leaving the medium and returning the condensed cyclooctene to the reaction vessel is effective to improve the yield greatly, but a refluxing operation of this kind tends to be unattractive because of the rather large volume of exit gases.

As a further example of the use of an acetic acid medium, a 1:4 mixture of cyclododecene and glacial acetic acid by volume, or by weight, is ozonized at 16° C. for a short time and then at 10°–12° until ozone no longer is absorbed. Oxidation then is carried out on the following time-temperature scale: 2 hours at 70°, 1.5 hours at 80°, 1.5 hours at 90°, and finally 1.5 hours at 100°, giving a 60%–61% yield of dodecanedioic acid. This is comparable with the 61.5% yield achieved with a propionic acid medium under the conditions summarized at the bottom of Table II.

Similarly, when the procedure for producing sebacic acid from cyclodecene set out hereinabove is followed, except that an equal weight of acetic acid is used in place of propionic acid and the ozonization is carried out at 12°–14°, a yield of about 60% is obtained.

In general it will be apparent to those skilled in the art that various factors can modify the exact yields obtained. Notable among these factors are the amount and nature of impurities in the starting material; also notable are variations in the equipment used and in such operating conditions as the temperature of ozonization and the details of the time-temperature schedule followed in accordance with the invention after heating is commenced while supplying oxygen. These and other variables readily can cause variations of several percent in the yields obtained from run to run under otherwise similar conditions. For example, the ultimate yield tends to be increased by carrying out the initial heating slowly, so that ample time is allowed for oxidation to proceed, especially at the lower temperature levels; however, a longer total time of oxidation then is required to realize the highest possible yield.

The yield figures given hereinabove are apparent yields, based on the assumption that the entire weight of the cycloalkene starting material is the pure cycloalkene. Actually the cycloalkene itself in the typical materials used ordinarily assays about 92% to 96% of the total weight of cycloalkene starting material. Thus the yields given in the examples hereinabove are somewhat lower than actual yields based on moles of cycloalkene actually present in the starting materials. Substantially accurate conversions from the apparent yield figures given in to actual percentage yields are obtained by assuming an assay of 94%–95% in the starting material, corresponding to an increase in the percentage yield computed by multiplying the yield figure given hereinabove by a reciprocal factor of 1.06. Thus a 66% yield based on the full weight of the starting material corresponds to a 70% actual yield using weights of pure reagents. If in a given process the assay of the starting material differs materially from 94%, for purposes of comparison actual yields should be used instead of apparent yields; when this is necessary, then percentage yield figures hereinabove and in the appended claims should be multiplied by the factor of 1.06.

It may be noted that the cycloalkenes having between 8 and 12 carbon atoms are obtained ordinarily as mixtures of the cis and trans modifications in various proportions. The use of one or the other of these modifications, or any mixture of the two, ordinarily has negligible, if any, effect on their ozonolysis. Consequently, except for considerations of purity, the source of a give number of moles of the cycloalkene as affecting these molecular modifications is of no concern in carrying out the method of the invention.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. The method of producing an alkanedioic acid having eight to twelve carbon atoms from a monoolefinic cycloalkene hydrocarbon, comprising: subjecting the cycloalkene which has the same number of carbon atoms as said alkanedioic acid to ozonization at a temperature below about 25° C., by supplying a gas containing about 2% to 7% ozone by weight to the cycloalkene hydrocarbon, said cycloalkene being present, in an amount at least about 10% of the total weight, dissolved in a liquid saturated lower fatty acid medium; thereafter heating said medium containing the product of ozonization to a temperature of approximately 65°–70° C., while passing gas rich in free oxygen into intimate contact therewith, to initiate oxidation of said product with production of said alkanedioic acid; further raising the temperature, while continuing to supply said oxygen-rich gas to said medium, in accordance with a predetermined schedule of at least two further temperature increases each of approximately 5°–20° C. to a final temperature of approximately 100°–110° C., the temperature being held relatively constant before and after each of said further temperature increases for time periods having substantial individual durations, all of said durations being of the same order of magnitude; and recovering said alkanedioic acid from said medium after the last of said time periods.

2. The method of producing suberic acid from cyclooctene, comprising: subjecting cyclooctene to ozonization at a temperature below about 25° C., by supplying a gas containing about 2% to 7% ozone by weight to the cyclooctene, said cyclooctene being present, in an amount at least about 10% of the total weight, dissolved in a liquid saturated lower fatty acid medium; thereafter heating said medium containing the product of ozonization to a temperature of approximately 65°–70° C., while passing gas rich in free oxygen into intimate contact therewith to initiate oxidation of said product with production of suberic acid; further raising the temperature, while continuing to supply said oxygen-rich gas to said medium, in accordance with a predetermined schedule of at least two further temperature increases each of approximately 5°–20° C. to a final temperature of approximately 100°–110° C., the temperature being held relatively constant before and after each of said further temperature increases for time periods having substantial individual durations, all of said durations being of the same order of magnitude; and recovering the suberic acid from said medium after the last of said time periods.

3. The method of producing suberic acid in accordance with claim 2, wherein the cyclooctene is subjected to ozonization in said liquid lower fatty acid medium at a temperature below about 15° C.

4. The method of producing suberic acid in accordance with claim 3, wherein said fatty acid medium which contains the cyclooctene dissolved therein is propionic acid.

5. The method of producing suberic acid in accordance with claim 2, wherein the fatty acid medium containing the cyclooctene dissolved therein is propionic acid.

6. The method of producing suberic acid in accordance with claim 2, wherein the fatty acid medium containing the cyclooctene dissolved therein is acetic acid.

7. The method of producing suberic acid in accordance with claim 2, wherein the fatty acid medium containing the cyclooctene dissolved therein is isobutyric acid.

8. The method of producing sebacic acid from cyclodecene, comprising: subjecting cyclodecene to ozonization at a temperature below about 25° C., by supplying a gas containing about 2% to 7% ozone by weight to the cyclodecene, said cyclodecene being present, in an amount at least about 10% of the total weight, dissolved in a liquid saturated lower fatty acid medium; heating said medium containing the product of ozonization to a temperature of approximately 65°–70° C., while passing gas rich in free oxygen into intimate contact therewith, to initiate oxidation of said product with production of sebacic acid; further raising the temperature, while continuing to supply said oxygen-rich gas to said medium, in accordance with a predetermined schedule of at least two further temperature increases each of approximately 5°–20° C. to a final temperature of approximately 100°–110° C., the temperature being held relatively constant before and after each of said further temperature increases for time periods having substantial individual durations, all of said durations being of the same order of magnitude; and recovering the sebacic acid from said medium after the last of said time periods.

9. The method of producing sebacic acid in accordance with claim 8, wherein the cyclodecene is subjected to ozonization in said liquid lower fatty acid medium at a temperature below about 20° C.

10. The method of producing sebacic acid in accordance with claim 9, wherein said fatty acid medium which contains the cyclodecene dissolved therein is propionic acid.

11. The method of producing sebacic acid in accordance with claim 8, wherein the fatty acid medium containing the cyclodecene dissolved therein is propionic acid.

12. The method of producing sebacic acid in accordance with claim 8, wherein the fatty acid medium containing the cyclodecene dissolved therein is acetic acid.

13. The method of producing sebacic acid in accordance with claim 8, wherein the fatty acid medium containing the cyclodecene dissolved therein is isobutyric acid.

14. The method of producing dodecanedioic acid from cyclododecene, comprising: subjecting cyclododecene to ozonization at a temperature below about 25° C., by supplying a gas containing about 2% to 7% ozone by weight to the cyclododecene, said cyclododecene being present, in an amount at least about 10% of the total weight, dissolved in a liquid saturated lower fatty acid medium; thereafter heating said medium containing the product of ozonization to a temperature of approximately 65°–70° C., while passing gas rich in free oxygen into intimate contact therewith, to initiate oxidation of said product with production of dodecanedioic acid; further raising the temperature, while continuing to supply said oxygen-rich gas to said medium, in accordance with a predetermined schedule of at least two further temperature increases each of approximately 5°–20° C. to a final temperature of approximately 100°–110° C., the temperature being held relatively constant before and after each of said further temperature increases for time periods having substantial individual durations, all of said durations being of the same order of magnitude; and recovering the dodecanedioic acid from said medium after the last of said time periods.

15. The method of producing dodecanedioic acid in accordance with claim 14, wherein the fatty acid medium containing the cyclododecene dissolved therein is propionic acid.

16. The method of producing dodecanedioic acid in accordance with claim 14, wherein the fatty acid medium containing the cyclododecene dissolved therein is acetic acid.

17. The method of producing dodecanedioic acid in accordance with claim 14, wherein the fatty acid medium containing the cyclododecene dissolved therein is isobutyric acid.

References Cited by the Examiner

UNITED STATES PATENTS

| | | | |
|---|---|---|---|
| 2,439,513 | 4/1948 | Hamblet et al. | 260—533 |
| 2,848,490 | 8/1958 | Niebling et al. | 260—537 |
| 3,059,028 | 10/1962 | Perry | 260—533 |

OTHER REFERENCES

Wilms, Justus Liebigs Annalen der Chemie, Band 567, pp. 96–99 (1952).

LORRAINE A. WEINBERGER, *Primary Examiner.*

LEON ZITVER, I. R. PELLMAN, S. B. WILLIAMS,
*Assistant Examiners.*